(12) United States Patent
Tanaka et al.

(10) Patent No.: US 6,518,342 B1
(45) Date of Patent: Feb. 11, 2003

(54) EMULSION FOR PRESSURE-SENSITIVE ADHESIVE

(75) Inventors: Yasumasa Tanaka, Kakogawa (JP); Naoki Tsunemine, Suita (JP); Osamu Konosu, Takatsuki (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/429,108

(22) Filed: Oct. 28, 1999

(30) Foreign Application Priority Data

Oct. 29, 1998 (JP) .......................................... 10-308995

(51) Int. Cl.⁷ .............................................. C08L 93/04
(52) U.S. Cl. ...................... 524/270; 524/271; 524/272
(58) Field of Search ................................ 524/270, 272, 524/271

(56) References Cited

U.S. PATENT DOCUMENTS 6,121,355 A * 9/2000 Tsunemine et al. ......... 524/270

FOREIGN PATENT DOCUMENTS

| EP | 44 09239 | 9/1995 |
|---|---|---|
| EP | 0 763 583 | 3/1997 |
| JP | 3-146582 | 6/1991 |
| JP | 5-76513 | 10/1993 |
| JP | 6-322347 | 11/1994 |
| JP | 8-3530 | 1/1996 |
| JP | 8-337765 | 12/1996 |

OTHER PUBLICATIONS

Patent Abstract of Japan, vol. 009, No. 222 (C–302), Sep. 9. 1985, JP 60–084371, May 13, 1985.

* cited by examiner

*Primary Examiner*—Judy M. Reddick
(74) *Attorney, Agent, or Firm*—Oblon, Spivak, McClelland, Maier & Neustadt, P.C.

(57) ABSTRACT

The present invention provides an emulsion for pressure-sensitive adhesive, and a pressure-sensitive adhesive product which exhibits high water resistance and high adhesion properties. The emulsion for pressure-sensitive adhesive includes as essential components: a pressure-sensitive adhesive polymer (A) having a glass-transition temperature of −80 to −20° C., a weight-average molecular weight of 150,000 or larger, and a carboxylic acid value of 30 or smaller; a rosin derivative (B) having a weight-average molecular weight of 100,000 or smaller, and containing at least part of the carboxyl groups being alkali salt with a carboxylic acid value of 190 or larger before alkalization; and a compound (C) having a weight-average molecular weight of 100,000 or smaller, and having no carboxyl group but having at least one functional group reactive with a carboxyl group in its molecule. The amount of the rosin derivative (B) is 2 to 30 mass percent when the total amount of the pressure-sensitive adhesive polymer (A) and the rosin derivative (B) in the emulsion is defined as 100 mass percent, and the compound (C) is contained in the emulsion so that the functional group of the compound (C) is in an amount of 0.05 to 10 equivalent with respect to one equivalent of the carboxyl groups of the rosin derivative (B) before alkalization.

20 Claims, No Drawings

EMULSION FOR PRESSURE-SENSITIVE ADHESIVE

BACKGROUND OF THE INVENTION

1. Field of the Invention

The present invention relates to an emulsion for pressure-sensitive adhesive which exhibits high adhesive strength to hard-to-adhere adherend such as polyolefin, high resistance to water, and high cohesive strength.

2. Description of the Related Art

In consideration of various factors such as environmental protection, safety in the working environment, resource saving, cost etc. there has been a large trend in recent years away from supplying solvent based adhesives (using an organic solvent as solvent medium) and more to supplying non-solvent adhesives (which do not use organic solvents). Amongst these non-solvent adhesives, pressure-sensitive adhesives emulsion have been favored in consideration of their general-purpose properties and workability. However, with these emulsion for pressure-sensitive adhesives, it is necessary to have a dispersant such as emulsifier in order to disperse the non-soluble pressure-sensitive adhesive polymer into the aqueous medium. Such a dispersant is water-soluble material, and there has been a problem that the resultant pressure-sensitive adhesive coating exhibits poor water-resistance.

The International Publication WO96/29373, filed by the present inventors, discloses an emulsion for pressure-sensitive adhesive which exhibits high water resistance. In the preparation of the emulsion, a compound which can chemically bond to the dispersant is added to the emulsion. After the emulsion is formed into a film, the carboxyl groups in the dispersant react with the compound, thereby nullifying the hydrophilic nature of the dispersant. The pressure-sensitive adhesive products produced using the emulsion has high water resistance.

It is true that the emulsion for the pressure-sensitive adhesive disclosed in the International Publication WO96/29373 can give high water resistance to the pressure-sensitive adhesive products. However, in recent years, there is an increasing demand for the pressure-sensitive adhesive products with superior adhesive properties including high adhesive strength, adhesion to polyolefin, and cohesive strength at high temperature, on top of high water resistance. In order to meet the demand, further studies have been conducted. As a method for providing such a pressure-sensitive adhesive products, it has been suggested to change the composition of the monomers for the pressure-sensitive adhesive polymer which is a component of the emulsion. As another method, it has been suggested that an adhesive strength modifier such as tackifier is added to the pressure-sensitive adhesive emulsion. However, most of tackifier are oil-soluble compound. When they are added to the pressure-sensitive adhesive emulsion, they require a large amount of emulsifier to be dispersed in water. The use of a large amount of emulsifier causes the deterioration in the water resistance of the pressure-sensitive adhesive products.

SUMMARY OF THE INVENTION

It is an object of the aspect of the present invention to provide an emulsion for pressure-sensitive adhesive which is capable of producing pressure-sensitive adhesive products having high resistance to water, and excellent adhesive properties such as high adhesive strength, adhesion to polyolefin, and high cohesive strength at high temperature.

In an aspect of the present invention, an emulsion for pressure-sensitive adhesive includes as essential components: a pressure-sensitive adhesive polymer (A) having a glass-transition temperature of −80 to −20° C., a weight-average molecular weight of 150,000 or larger, and a carboxylic acid value of 30 or smaller; a rosin derivative (B) having a weight-average molecular weight of 100,000 or smaller, and containing at least part of the carboxyl groups being alkali salt with a carboxylic acid value of 190 or larger before alkalization; and a compound (C) having a weight-average molecular weight of 100,000 or smaller, and having no carboxyl group but having at least one functional group reactive with a carboxyl group in its molecule. The amount of the rosin derivative (B) is 2 to 30 mass percent when the total amount of the pressure-sensitive adhesive polymer (A) and the rosin derivative (B) in the emulsion is defined as 100 mass percent, and the compound (C) is contained in the emulsion so that the functional group of the compound (C) is in an amount of 0.05 to 10 equivalent with respect to one equivalent of the carboxyl groups of the rosin derivative (B) before alkalization.

DETAILED DESCRIPTION OF THE INVENTION

The emulsion for pressure-sensitive adhesive of the present invention contains, as essential components, a pressure-sensitive adhesive polymer (A), a rosin derivative (B) and a compound (C). The most outstanding feature of the present invention resides in that the rosin derivative (B) having carboxyl groups is stabilized in the form of alkali salt in the emulsion without no need of much help of an emulsifier, and after the emulsion forms a pressure-sensitive adhesive layer, the carboxyl groups in the rosin derivative (B) (substantially, the carboxyl groups in the rosin derivative (B'), as will be described later) are chemically reacted with the compound (C) to nullify the hydrophilic nature of the rosin derivative (B). The rosin derivative (B) can sufficiently show its ability of improving adhesive strength while the layer keeps its water resistance high. Hereinafter, the present invention will be described in detail. In the description, the term "polymer" includes not only homopolymer but also multi-polymer including copolymers and terpolymers. It should be appreciated that the pressure-sensitive adhesive polymer (A), the rosin derivative (B) and the compound (C) are compounds different to one another.

First, the pressure-sensitive adhesive polymer (A) which is the first essential component will be described. The pressure-sensitive adhesive polymer (A) is a polymer which can display pressure-sensitive adhesiveness in the range of temperatures at which pressure-sensitive adhesive products are generally used. There are two types of polymer as the pressure-sensitive adhesive polymer (A): one type does not dissolve in water and alkali aqueous solution but can be emulsified by water-soluble emulsifier other than the polymer (A) and be made into a water dispersion and the other type can emulsify in itself. The latter type is obtained by using an emulsifier having reactivity with a monomer for the polymer (A). By use of the reactive emulsifier such as emulsifier having an ethylenically unsaturated double bond in the emulsion polymerization, the reactive emulsifier chemically bonds to the molecular chains of the pressure-sensitive adhesive polymer by polymerization. As a result, the polymer incorporated with the reactive emulsifier is obtained, and the polymer can emulsify in itself. In this invention the latter type is preferably used as well as the former type as the pressure-sensitive adhesive polymer (A).

A glass-transition temperature (Tg) of the pressure-sensitive adhesive polymer (A) is in the range of −80 to −20°

C. The pressure-sensitive adhesive polymer (A) having the Tg of −20° C or higher may not exhibit its pressure-sensitive adhesiveness at a room temperature in some cases. To avoid this trouble, the upper limit of the Tg is determined to −20° C. Contrary to this, the Tg of lower than −80° C. is not preferable because the cohesive strength at high temperature tends to deteriorate. The glass-transition temperature Tg (K) can be easily obtained b the calculation from the following Formula using the Tg (K) of each homopolymer described in "POLYMER HANDBOOK, the third edition (issued by John Wiley & Sons, Inc.)", or can be obtained using a differential scanning calorimetry apparatus (DSC) or a differential thermal analysis apparatus (DTA).

$$\frac{W}{Tg} = \frac{W_1}{Tg_1} + \frac{W_2}{Tg_2} + \ldots + \frac{W_n}{Tg_n}$$

wherein Wn is a mass fraction of each monomer; and

Tg$_n$ is the Tg (K) of the homopolymer of each monomer.

The pressure-sensitive adhesive polymer (A) has a weight-average molecular weight (Mw) of 150,000 or larger. If the Mw is smaller than 150,000, the adhesive properties become poor. The molecular weight is a value converted to polystyrene measured by a gel permeation chromatography (GPC) Similarly, the Mw and the Mn are values converted to polystyrene measured by a gel permeation chromatography (GPC). A polymer having a large molecular weight, specifically, the Mw of about 1,500,000 or more, does not dissolve in a solvent (tetrahydrofuran; THF) which is used in the measurement using a GPC. Therefore, the measurement of the molecular weight using a GPC becomes impossible, and an accurate Mw cannot be obtained. In this case, however, it means that the polymer which does not dissolve in THF has a molecular weight of about 1,500,000 or more. Such a polymer is preferably used in the present invention. The solubility of the polymer is evaluated by the following steps:

(1) The pressure-sensitive adhesive polymer is properly sampled, and the mass of the sample in a dry state is measured (if the sample is an emulsion, the weight of the sample is measured after the water is evaporated therefrom.);

(2) The dried sample is put into tetrahydrofuran 10 times as heavy as the sample in mass, and the mixture is left at a temperature in the range from a room temperature to 40° C. for 24 hours while stirred sometime. The dissolution of the sample may be promoted by the application of heat or supersonic waves;

(3) After 24 hours, the mixture is filtered through a wire gauze having 300 meshes, and the sample remaining on the wire gauze is dried and its mass is measured. The remaining sample on the wire gauze is regarded as an insoluble portion of the sample, and its weight is expressed by an initial mass percentage; and (4) If the insoluble portion is 50 mass percent or more, it is judged that the sample is insoluble in tetrahydrofuran, and has a Mw of 1,500,000 or larger. In this case, the measurement of the molecular weight of the sample is regarded to be impossible. If the insoluble portion is less than 50 mass percent, the molecular weight of the sample dissolved in the solution of tetrahydrofuran is measured by a gel permeation chromatography.

The pressure-sensitive adhesive polymer (A) has an acid value (i.e. carboxyl group value) of 30 or smaller. The acid value of larger than 30 is not preferable, because the Tg tends to be higher than −20° C. In addition, in this case, the compound (C) reacts with the carboxyl groups in the pressure-sensitive adhesive polymer (A), and the polymer chains in the pressure-sensitive adhesive polymer (A) are crosslinked. This results in lowering the adhesive strength of the pressure-sensitive adhesive product. In the present invention, the acid value, i.e. the carboxylic acid value, is obtained by dissolving 1 g of compound having carboxyl groups into a good solvent, and then subjecting the mixture to a neutralization titration with KOH. The amount of the KOH needed in the neutralization titration is expressed by a unit of mg, and this value is adopted as the acid value.

Specific examples of the pressure-sensitive adhesive polymer (A) include rubber based polymers such as natural rubbers, styrene-isoprene-styrene (SIS) block copolymers, styrene-butadiene-styrene (SBS) block copolymers, and synthetic rubbers, and polymers is obtained by polymerization of monomers having ethylenically unsaturated double bond. Among them, acrylic polymers is obtained by polymerization of monomers including alkyl (meth) acrylate as a main component are preferable because they give high adhesive properties to the resultant pressure-sensitive adhesive product.

As the alkyl(meth)acrylate which constitutes the acrylic polymers, one or more kind of alkyl (meth)acrylate monomer having an alkyl group having 4 to 12 carbon atoms is preferable, and the specific examples thereof include butyl (meth)acrylate, amyl (meth)acrylate, heptyl (meth)acrylate, 2-ethylhexyl (meth) acrylate, n-octyl (meth)acrylate, isooctyl (meth)acrylate, nonyl (meth)acrylate, isononyl (meth) acrylate, decyl (meth)acrylate, and dodecyl (meth)acrylate.

The acrylic polymer may be composed of the alkyl (meth)acrylates alone, or may be composed of the alkyl (meth)acrylate and the other monomers which are copolymerized with each other. In the latter case, in order to give high adhesive properties to the resultant pressure-sensitive adhesive product, it is preferable that 60 mass percent or more of alkyl (meth)acrylate is used with respect to the entire monomers.

Specific examples of the other monomers include (meth) acrylic acid, cycloalkyl (meth)acrylate, (meth)acrylates having alkyl groups with 3 or less carbon atoms, (meth)acrylates having carboxyl groups, (meth)acrylates having hydroxyl groups such as 2-hydroxyethyl (meth)acrylate, aromatic unsaturated hydrocarbons such as styrene and α-methyl styrene, vinyl esters, vinyl ethers such as methyl vinyl ether, unsaturated cyano compounds such as acrylonitrile, and nitrogen-containing monomers such as N-isopropylacrylamide, N-vinylpyrrolidone, and N, N-dimethylaminoethyl (meth)acrylate.

Next, the rosin derivative (B) which is the second essential component in the pressure-sensitive adhesive emulsion of the present invention will be described. The rosin derivative (B) has weight-average molecular weight of 100,000 or smaller, and having carboxyl groups so that its acid value becomes 190 or larger before alkalization. A part or all of the carboxyl groups thereof is alkali salt. For convenience, the rosin derivative having carboxyl groups before alkalization (being made into alkali salt) is referred to as a rosin derivative (B').

In the present invention, the "rosin derivative" is a rosin which has been subjected to at least carboxylic acid modification, as distinct from rosins derived from pine which are roughly classified into gum rosins, wood rosins, and tall oil rosins. Rosins originally have carboxyl groups, and the acid value of most of them never exceeds 190 as far as they are not subjected to carboxylic acid modification.

The carboxylic acid modification is conducted by reacting the rosins with a carboxylic acid such as acrylic acid, itaconic acid, fumaric acid, and maleic acid to introduce the carboxyl groups into the rosins. On top of the above-described rosin, rosins such as hydrogenated rosin, disproportionated rosin, and polymerized rosin may be used as far as they have an acid value of 190 or larger. Among them, hydrogenated rosin is effective in giving high weatherability and high yellowing resistance to the resultant pressure-sensitive adhesive product.

The rosin derivative is a tackifier, as is well-known to one skilled in the art. The rosins have an effect of improving an adhesive strength. Therefore, when the pressure-sensitive adhesive emulsion containing the rosin derivative (B) is coated, the rosin derivative (B') enhances the adhesive strength of the coating. If the emulsion does not contain the rosin derivative (B) and such an emulsion is applied onto the surface which has been subjected to a releasing treatment with a silicone resin and therefore has a low surface energy, the emulsion is repelled on the surface (that is, the emulsion does not form a layer but forms a plurality of droplets.) and cannot be successfully spread onto the surface . Contrary to this, if the emulsion contains the rosin derivative (B), there is no such a problem. This is because a part of the rosin derivative (B) is dissolved in the aqueous phase of the alkaline emulsion in the state that its carboxyl groups are made into alkali salt, and that the rosin derivative (B) decreases dynamic surface tension of the emulsion.

In the pressure-sensitive adhesive emulsion, it is conceived that the rosin derivative (B) is in the state described below. A part of the rosin derivative (B) is dissolved in the aqueous phase of the alkaline emulsion in the state that its carboxyl groups are made into alkali salt. The another part thereof is in the form of oil-drop in the emulsion, and is stabilized by its carboxyl groups or the alkali salt thereof. Also a part of the rosin derivative (B) of which carboxyl groups are alkali salt is adsorbed onto the surface of the oil-drop of the pressure-sensitive adhesive polymer (A), thereby serving as an emulsifier for stabilizing the oil-drops of the pressure-sensitive adhesive polymer (A). In combination of these features, the rosin derivative (B) can be stably present in the pressure-sensitive adhesive emulsion of the present invention. The alkaline means the condition of pH 7 or more.

In order to be stable in the pressure-sensitive adhesive emulsion, the rosin derivative (B) having carboxyl groups before alkalization, i.e. the rosin derivative (B'), is required to have an acid value of 190 or larger. If the rosin derivative (B') has an acid value of less than 190, the rosin derivative (B) cannot be stably present in the emulsion even if all the carboxyl groups of the rosin derivative (B') are made into alkali salt. The reason of this is as follows. When the rosin derivative (B') having an acid value of less than 190 is used, a large amount of other kind of emulsifier is required in order to disperse the rosin derivative (B) into the emulsion in a stable state. Without the large amount of emulsifier, the rosin derivative (B) is not sufficiently emulsified, and the oil-drops of the rosin derivative (B) bond to each other in the emulsion. As a result, the rosin derivative (B) coagulate and settle in the emulsion. In addition, the use of the large amount of the emulsifier results in poor water resistance of the film made of the pressure-sensitive adhesive emulsion.

The preferable acid value of the rosin derivative (B') is 210 or larger. Setting the acid value as above improves stability of the rosin derivative (B) in the emulsion. If the acid value is set exceeding larger than the above, water resistance of the resultant pressure-sensitive adhesive product is deteriorated despite the effect of nullifying hydrophilic nature by compound (C) which will be described later. In view thereof, the acid value of the rosin derivative (B') is 270 or smaller preferably.

By employing the following steps, the rosin derivative (B) can be easily present in the emulsion in a stable state. First, an emulsion of the pressure-sensitive adhesive polymer (A) is synthesized by emulsion polymerization using an emulsifier, and then an alkaline aqueous solution such as ammonia water is added thereto to make the emulsion alkaline. After that, the rosin derivative (B') having an acid value of 190 or larger is added to the emulsion. A part or all of the carboxyl groups of the rosin derivative (B') added to the emulsion becomes alkali salt, and as a result, the rosin derivative (B') becomes the rosin derivative (B).

As described above, the rosin derivative (B) is stably present in the emulsion without much help of an emulsifier. By using the rosin derivative (B), the absolute amount of the emulsifier in the emulsion is decreased. When the emulsion is formed into a film, alkali is evaporated therefrom, and the rosin derivative (B) becomes the rosin derivative (B') again. In the resultant film, a large amount of carboxyl groups derived from the rosin derivative (B') is present. In the present invention, the rosin derivative (B') is reacted with the compound (C) so that the carboxyl groups of the rosin derivative (B) chemically react with the functional groups having reactivity with carboxyl groups of the compound (C). Through this reaction, the carboxyl groups are consumed, and their hydrophilic nature is nullified. As a result, the film has high water resistance.

The molecular weight of the rosin derivative (B) (substantially, the molecular weight of the rosin derivative (B')), expressed by a weight-average molecular weight (Mw) is 100,000 or lower. If the Mw is larger than 100,000, the resultant film may have low transparency when the compatibility between the rosin derivative (B) and the pressure-sensitive adhesive polymer (A) is not good. The upper limit of Mw may be preferable 10,000, more preferable 6000, further more preferable 3000. The preferable lower limit of the Mw is 100. If the Mw is smaller than 100, the rosin derivative (B) does not have a sufficient effect of improving an adhesive strength.

The rosin derivative (B') preferably has a softening point of 200° C. or lower. More preferably, the softening point is in the range of 80 to 180° C. If the softening point is lower than 80° C. is used, the cohesive strength of the pressure-sensitive adhesive product tends to deteriorate. However, the rosin derivative (B') having a softening point of lower than 80° C may be exceptionally used in the case where the pressure-sensitive adhesive product is intended for use in an environment at a low temperature, or the pressure-sensitive adhesive product is required to have high adhesiveness to an adherend having a rough surface.

In the emulsion, the amount of the rosin derivative (B) is 2 to 30 mass percent (solid content) when the total weight of the pressure-sensitive adhesive polymer (A) is defined as 100 mass percent. The rosin derivative (B) of less than 2 mass percent has a poor effect of improving the adhesive properties. Contrary to this, the rosin derivative (B) of larger than 30 mass percent destroys the balance of the adhesive properties. More preferably, the amount of the rosin derivative (B) is 10 to 23 mass percent.

Lastly the compound (C), which is the third essential component of the emulsion for pressure-sensitive adhesive will be described. The compound (C) has no carboxyl group, but has at least one functional group which has a reactivity with a carboxyl group in its molecule. After the pressure-sensitive adhesive emulsion is formed into a film, the compound (C) is reacted with the rosin derivative (B') so that the carboxyl groups of the rosin derivative (B') are reacted with the functional group of the compound (C), resulting in nullifying the hydrophilic nature of the rosin derivative (B'). As a result, the water resistance of the film is improved.

For this reason, the compound (C) is required to have at least one functional group reactive with the carboxyl groups of the rosin group (B'). Examples of the functional group include glycidyl group, aziridinyl group, oxazolinyl group, and isocyanate group. When the compound (C) has an isocyanate group, it is preferable to use the compound (C) with the isocyanate group blocked (blocked isocyanate), because the isocyanate group reacts with water which is a medium of the emulsion. As described above, no carboxyl group is contained in the compound (C). If the compound (C) has a carboxyl group, the functional group of another compound (C) reacts with the carboxyl group of the former compound (C). Therefore the functional group of the later compound (C) is consumed. As a result, the compound (C) loses the reactivity with the carboxyl groups of the rosin derivative (B'), although it is a property required for the compound (C).

As described above, the compound (C) is necessary at the chemical reaction between the rosin derivative (B') and the compound (C) after coating of the emulsion. Therefore the compound (C) should exist in the emulsion before coating. The compound (C) may be dissolved in water or oil, specifically the compound (C) may exist in water phase in the emulsion or in the oil-drop of the pressure-sensitive adhesive polymer (A). The preferable Mw of the compound (C) is smaller than 100,000. If the Mw is larger than 100,000, in the both cases of the compound (C) being water-soluble and oil-soluble, the compound (C) can not dissolve easily in water or oil. In view of the solubility to the emulsion, the upper limit of Mw of the compound (C) may be preferable 10,000, more preferable 5000.

Specific examples of the compound (C) is as follows:

glycidyl group-containing compounds: aliphatic oxides such as propylene oxide; aromatic oxides such as styrene oxide; alicyclic epoxides such as cyclohexene oxide; aliphatic glycidyl ethers such as butyl glycidyl ether and EPOLIGHT® M-1230 (a product of Kyoeisha Chemical Co., Ltd.); armoatic glycidyl ethers such as phenyl glycidyl ether; glycidyl esters such as glycidyl (meth)acrylate; glycidyl amine compounds such as TETRAD® series (products of Mitsubishi Gas Chemical Co., Ltd.); and polyglycidyl ethers such as DENACOL® series (products of Nagase & Co., Ltd.), aziridinyl group-containing compounds: aliphatic aziridines such as butylaziridine; aromatic aziridines such as phenylaziridine; unsaturated group-containing aziridines such as 2-(1-aziridinyl) ethyl(meth)acrylate; and CHEMITITE® series (products of Nippon Shokubai Co., Ltd.), oxazolinyl group-containing compounds: aliphatic oxiazolines such as 2-methyl oxazoline; aromatic oxazolines such as 2-phenyl oxazoline; unsaturated group-containing oxazolines such as 2-isopropenyl-2-oxazoline; and EPOCROSS® series (products of Nippon Shokubai Co., Ltd.), isocyanate group-containing compounds: general-purpose isocyanates such as tolylene diisocyanate (TDI) and diphenylmethane diisocyanate (MDI); blocked polyisocyanates such as DESMODULE AP STABLE and DESMODULE CT STABLE (products of Sumitomo Bayer Co., Ltd.); blocked isocyanate-containing prepolymers such as DESMOCUP 11 (a product of Daiichi Kogyo Seiyaku Co., Ltd.); and water dispersion type blocked isocyanates such as ELASTRON series and ELASTRON BN series (products of Daiichi Kogyo Seiyaku Co., Ltd.).

Among them, glycidyl amine compounds (TETRAD®-C and TETRAD®-X, products of Mitsubishi Gas Chemical Co., Ltd.) and aziridinyl group-containing compounds (CHEMITITE® PZ-33 and CHEMITITE® DZ-22, products of Nippon Shokubai Co., Ltd.) have high reactivity, and are preferably used.

The amount of the functional group having reactivity with a carboxyl group of the compound (C) is in the range of 0.05 to 10 equivalent with respect to one equivalent of the carboxyl group of the rosin derivative (B) (in this case, the carboxyl group means both the carboxyl group itself and that in the form of alkali salt. Substantially, the carboxyl group of the rosin derivative (B')). The compound (C) in an amount of less than 0.05 equivalent has no sufficient effect of improving the water resistance. The above amount may be preferable in the range of 0.1 to 5 equivalent.

The emulsion of this invention may contain the water-soluble emulsifier. The emulsifier is necessary to disperse the oil-soluble pressure-sensitive adhesive polymer (A) in water stably, and keep the emulsion state. An emulsifier, i.e. a surface ative agent, has a hydrophilic group such as sulfonate group and carboxylate group, and a hydrophobic group such as hydrocarbon group, and has an ability of emulsifying. In the present invention, the emulsifier having no functional groups having reactivity with a carboxyl group is used. Since the compound (C) having such a functional group exists in the emulsion, the emulsifier is not necessary to have such a functional group. In view thereof, the emulsifier is a compound different from the compound (C).

The preferable Mw of the emulsifier is smaller than 100,000. The smaller Mw is the effect of decreasing the surface tension of the emulsion. This facilities the coating step of the emulsion. In view thereof, the upper limit of Mw of the emulsifier may be preferable 10,000, more preferable 3,000. In view of water resistance, the preferable acid value of the dispersant is 185 or smaller.

There are no particular limitation regarding the kind of the emulsifier. Specific examples of emulsifiers which can be used as emulsifier, anionic emulsifier such as sodium alkyl sulfates, alkylbenzene sulfonates, alkylnaphthalene sulfonates, alkyldiphenylether disulfonate, polyoxyethylene alkyl sulfates, polyoxyethylene alkylaryl sulfonate, naphthalene sulfuric acid formaldehyde condensates; nonionic emulsifier such as polyoxyethylene alkylethers, polyoxyethylene alkylaryl ethers, polyoxyethylene derivatives, sorbitan fatty acid esters, polyoxyethylene sorbitan fatty acid esters, polyoxyethylene sorbitol fatty acid esters, grycerol fatty acid esters, polyoxyethylene fatty acid esters, alkylalkanol amides.

As the emulsifier, an emulsifier having a carboxyl group may be used. Specifically, the emulsifier is a carboxyl group-containing emulsifier such as basic acids having 8 to 28 carbon atoms. Examples thereof include: fatty acid soap; N-acylamino acids (salts); alkyl ether carboxylic acid such as MX-RLM series (products of Kao Corporation); acyl peptides; carboxyl betaine emulsifiers; amino carboxylic acids; polycarboxylic acid type polymer emulsifiers such as LATEMUL series, DEMOL series, POIZ series, and HOMOGENOL series (products of Kao Corporation); RA-1020, RA-1120, and RA-1820 (products of Nippon Surfactant Co., Ltd.); SLB-12, ULB-20, SL-20, SB-20, ST-2P, and IPU-22 (products of Okamura Seiyu Co., Ltd.);

and PDSA-DB, PDSA-DA, DSA, and SUN HIBITTER-150 (products of Sanyo Kasei Kogyo Co., Ltd.). After the pressure-sensitive adhesive emulsion is formed into a film, the emulsifier is reacted with the compound (C) so that the carboxyl groups in the emulsifier react with the functional group of the compound (C). Through this reaction, the carboxyl groups are consumed, thereby giving high water resistance to the resultant pressure-sensitive adhesive product.

As the emulsifier for use in the emulsion polymerization, a carboxyl group-containing oligomer emulsifier which is capable of achieving excellent emulsion stability in the emulsion polymerization may be used. Specific example thereof is a dispersant disclosed in the International Publication WO96/29373. The dispersant is produced by polymerizing monomers containing an unsaturated carboxylic acid (for example, acrylic acid) as an essential component in the presence of alkyl mercaptan having 6 to 18 carbon atoms.

The aforementioned emulsifiers have no reactivity with a monomer for the pressure-sensitive adhesive polymer (A), and accordingly differ from the following reactive emulsifier. Therefore, in the emulsion, these non-reactive emulsifiers absorb the oil-drop of the polymer (A), but do not bond to the polymer chemically.

It is preferable to use a reactive emulsifier as the emulsifier. As an example of the reactive emulsifier used in this invention, there is a reactive emulsifier having an ethylenically unsaturated double bond and having reactivity with a monomer for the pressure-sensitive adhesive polymer (A). By use of the reactive emulsifier having double bond in the emulsion polymerization, the reactive emulsifier bonds to the molecular chains of the pressure-sensitive adhesive polymer (A) by polymerization, and no molecules of the reactive emulsifier exist alone. As a result, the emulsifier never causes the deterioration of the water resistance of the pressure-sensitive adhesive product.

Examples of the reactive emulsifier having the double bond is as follows. There may be used alone or in combination of two or more of them.

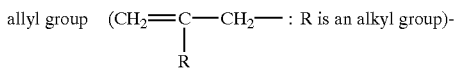

allyl group    (CH₂=C—CH₂— : R is an alkyl group)-
                    |
                    R containing anionic emulsifiers: such as sulfates of polyoxyethylene allylglycidyl nonylphenyl ether: as products available on the market known are ADEKARIA SOAP SE series (products of Asahi Denka Co., Ltd.), ELEMINOL JS series (products of Sanyo Kasei Co., Ltd.), LATEMUL S series (products of Kao Corporation), H3390A, H3390B (products of Daiichi Kogyo Seiyaku Co., Ltd.) and the like.

allyl group-containing nonionic emulsifiers: such as polyoxyethylene allylglycidyl nonylphenyl ether: as products available on the market known are ADEKARIA SOAP NE series (products of Asahi Denka Co., Ltd.) and the like.

allyl group-containing cationic emulsifiers: as products available on the market known are RF-751 (a product of Nippon Surfactant Co., Ltd.) and the like.

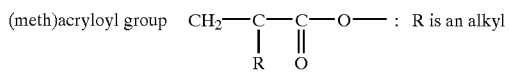

(meth)acryloyl group    CH₂—C—C—O— : R is an alkyl
                             |  ||
                             R  O group)-containing anionic emulsifiers: as products available on the market known are ELEMINOL RS series (products of Sanyo Kasei Co., Ltd.), ANTOX series (products of Nippon Surfactant Co., Ltd.) and the like.

(meth)acryloyl group-containing nonionic emulsifiers: as products available on the market known are RMA-560 series (products of Nippon Surfactant Co., Ltd.), and the like.

propenyl group (CH₃—CH=CH—)-containing anionic emulsifiers: such as ammonium sulfate of polyoxyethylene nonyl propenyl phenyl ether: as products available on the market known are AQUARON HS series, AQUARON BC series (products of Daiichi Kogyo Seiyaku Co., Ltd.) and the like.

propenyl group-containing nonionic emulsifiers: such as polyoxyethylene nonyl propenyl phenyl ether: as products available on the market known are AQUARON RN series (products of Daiichi Kogyo Seiyaku Co., Ltd.) and the like.

The use amount of the emulsifier is 0.5 to 10 parts by mass with respect to 100 parts by mass of the monomers for the pressure-sensitive polymer (A). Aforementioned various kind of emulsifiers may be used in combination.

Hereinafter, preferable methods for producing the emulsion for pressure-sensitive adhesive of the present invention will be described. In a first method, the monomers for the pressure-sensitive adhesive polymer (A) is polymerized by emulsion polymerization using the emulsifier having no reactivity with a monomer for the pressure-sensitive adhesive polymer (A) and/or the reactive emulsifier having an ethylenically unsaturated double bond, and the condition of the resultant emulsion of the pressure-sensitive adhesive polymer (A) is turned into alkaline. Then, the rosin derivative (B') and the compound (C) are added to the emulsion. By employment of the polymerization of the pressure-sensitive adhesive polymer (A), the resultant emulsion can be used as an emulsion as it is. Therefore, the first method is a simple method for producing the emulsion for pressure-sensitive adhesive. The monomers for the pressure-sensitive adhesive polymer (A) may be polymerized by emulsion polymerization using the emulsifier and a known aqueous polymerization initiator under the known conditions.

The rosin derivative (B') can act as an emulsifier, because it has a large amount of carboxyl groups (which are hydrophilic groups) and also has an oil-soluble moiety (which is hydrophobic group) derived from the rosin. Taking advantage of this feature, it is possible to use the rosin derivative (B') as an emulsifier in combination with the emulsifier in the emulsion polymerization for preparing the pressure-sensitive adhesive polymer (A). In this case, the rosin derivative (B') in an amount corresponding to a part or all of the amount of the rosin derivative (B) to be present in the finally obtained pressure-sensitive adhesive emulsion is put into the polymerization vessel as an emulsifier at an initial stage of the emulsion polymerization. In the view of stability in the emulsion polymerization and storage of the emulsion, it may be preferably to use the emulsifier having no reactivity with a monomer for the pressure-sensitive adhesive polymer (A) and/or the reactive emulsifier having an ethylenically unsaturated double bond.

The condition of the emulsion may be turned into alkaline to change the rosin derivative (B') into the rosin derivative (B) at any stage of the emulsion polymerization. The pH of the water medium for use in the emulsion polymerization is adjusted to 7 or higher before, during, or after the emulsion polymerization so that the water medium has an alkaline condition. Into the alkaline water medium, the rosin derivative (B') is added. As a result, the emulsion containing the rosin derivative (B) can be obtained. The amount of the rosin derivative (B') corresponds to the amount of the rosin derivative (B) required to be present in the finally-obtained emulsion, and all the rosin derivative (B') may be added at once, or may be gradually added. If the rosin derivative (B') is in a solid state at a room temperature, it may be powdered and is added to the water medium. Alternatively, the rosin derivative (B') may be dissolved in an alkaline aqueous solution beforehand to prepare the rosin derivative (B), and the solution of the rosin derivative (B) may be added to the emulsion or the polymerization vessel. The rosin derivative (B') is preferably added at a temperature in the range of 0 to 90° C.

Examples of the alkali compounds for preparing the alkaline emulsion or alkaline aqueous solution of the rosin derivative (B) include alkali metal compounds such as sodium hydroxide, alkaline earth metal compounds, alkyl amines such as methylamine, and ammonia. Among them, alkyl amines and ammonia are preferable, because they have high volatility, and therefore, after the pressure-sensitive adhesive emulsion is formed into a film, they evaporate and never remain in the dried film. The resultant film has high water resistance.

The timing of adding the compound (C) to the emulsion is not specifically limited. It is preferable that the compound (C) is added after the emulsion polymerization is finished and before the emulsion for pressure-sensitive adhesive is applied to a substrate. In this manner, the compound (C) does not chemically reacts with the rosin derivative (B) during the emulsion polymerization and during storage of the emulsion for pressure-sensitive adhesive. The compound (C) may be added to the emulsion as it is, or may be added as a water dispersion prepared using an emulsifier.

In the second method for producing the emulsion for pressure-sensitive adhesive, the pressure-sensitive adhesive polymer (A) is prepared by a polymerization other than emulsion polymerization beforehand. To the pressure-sensitive adhesive polymer (A), water, and the emulsifier are added, and the mixture is mechanically stirred to prepare an emulsion. To the emulsion, the rosin derivative (B') and the compound (C) are added, and as a result, the pressure-sensitive adhesive emulsion is obtained. In the third method, the pressure-sensitive adhesive polymer (A) and the rosin derivative (B') are respectively melt by the application of heat to mix together, and the mixture is formed into emulsion according to the above manner. In these cases, during or after the preparation of the emulsion of the pressure-sensitive adhesive polymer (A), the condition thereof is adjusted to alkaline, and the rosin derivative (B') is added thereto. The compound (C) is preferable added to the emulsion that is obtained by emulsifying the pressure-sensitive adhesive polymer (A) and before the emulsion for pressure-sensitive adhesive is applied to a substrate. Instead of the emulsion polymerization, the pressure-sensitive adhesive polymer (A) can be produced by a solution polymerization or a bulk polymerization. It is also possible that the pressure-sensitive adhesive polymer (A) is produced by an emulsion polymerization or a suspension polymerization, and then is separated from water before used. It is possible to add conventionally known additives such as cross-linking agents, wetting agents, viscosity adjustors, thickners, defoaming agents, modifiers, tackifiers, pigments, coloring agents, fillers, anti-oxidants, UV absorbents, and UV stabilizers to the extent that they do not have a bad effect on the emulsion for pressure-sensitive adhesive or the pressure-sensitive adhesive product.

The emulsion for pressure-sensitive adhesive is used in producing pressure-sensitive adhesive products. For example, the emulsion for the pressure-sensitive adhesive is applied onto a substrate such as plastic film, paper, non-woven fabric, and foam, or a release sheet, and is dried to form a film. There are pressure-sensitive adhesive products in which a layer of the pressure-sensitive adhesive is formed only on its single side, and in which a layer of the pressure-sensitive adhesive is formed on its both sides. There are also pressure-sensitive adhesive products including a layer of the pressure-sensitive adhesive alone having no substrate. On top of the pressure-sensitive adhesive products, the emulsion of the present invention may be used in various other applications such as adhesives, paints, paper processing agents, fiber processing agents, mortar improving agents, and sealing agents.

EXAMPLES

Hereinafter, the present invention will be described in detail by way of examples. However, the scope of the present invention is not limited to these examples. Unless particularly specified, "percent" and "parts" refer to "mass percent" and "parts by mass" respectively.

Example 1

[Emulsion Polymerization for Preparing Pressure-sensitive Adhesive Polymer]

100 parts of monomer components having a composition of Table 1, 0.05 parts of tert-dodecyl mercaptan (hereinafter, referred to as TDM) as a chain transfer agent, 1.5 parts of "HITENOL N-08" (polyoxyethylene alkylphenyl ether sulfonate, a product of Daiichi Kogyo Seiyaku Co., Ltd.) as an emulsifier, 0.05 parts of azobiscyano valeric acid (hereinafter, referred to as ACVA) as a polymerization initiator, and 35 parts of deionized water were mixed and stirred with each other, thereby preparing a monomer pre-emulsion.

Into a flask equipped with a dropping funnel, a stirrer, a thermometer, a nitrogen gas inlet pipe, and a reflux condenser, 33 parts of deionized water, 0.1 parts of initiator ACVA and 2% of the monomer pre-emulsion were charged, and polymerization was carried out for 10 minutes at about 80° C. in a nitrogen atmosphere. Then 98% of the monomer pre-emulsion was added dropwise into the flask for about 3 hours at about 80° C. in a nitrogen atmosphere to carry out polymerization. After the completion of the dropwise addition, it was kept at 80° C. for about 3 hours. As a result, an emulsion of pressure-sensitive adhesive polymer (A-1) was obtained. The glass-transition temperature (Tg) (° C.) and the weight-average molecular weight (Mw) of the pressure-sensitive adhesive polymer (A-1) are shown in Table 1. The Tg (° C.) was calculated using the Formula mentioned earlier and the Tg (K) of homopolymer of each monomer which will be described later. The average-weight molecular weight Mw is a value converted to polystyrene measured using a gel permeation chromatography (GPC).

[Blending the Rosin Derivative into the Emulsion of the Pressure-sensitive Adhesive Polymer]

Into a flask in which the emulsion of the pressure-sensitive adhesive polymer (A-1) was put, 2.2 parts of 25% aqueous solution of ammonia was added, and while the mixture was kept at 80° C., 10 parts of a rosin derivative (B') having an acid value of 235 and a softening point of 127° C. ("KE-604": acid modified rosin having Mn of 400 and Mw of 410, a product of Arakawa Kagaku Co., Ltd.) was properly crushed and added thereto. Water of certain amount was added so that the solid content of the resultant mixture was theoretically supposed to be about 55%. The mixture was stirred for about 1 hour, and an emulsion (AB-1) in which a rosin derivative (B) was dissolved was obtained. The solid content (%), the average particle diameter (nm), and the pH of the rosin derivative-containing emulsion (AB-1) were measured, and the results of the measurement are as shown in Table 1.

[Blending of Compound (C)]

100 parts of the emulsion (AB-1) was mixed with "PRIMAL ASE-60" as a thickner and the viscosity was adjusted to 10000±8000 mPa·s (25° C.; a Brookfield type viscometer). Then, into the emulsion (AB-1), added was 1.0 parts (corresponding to 0.34 equivalent with respect to one equivalent of the carboxyl group of the "KE-604" described above) of "CHEMITITE PZ-33" (a compound having 3 aziridinyl groups in its one molecule, and a molecular weight of 425 in accordance with a catalogue, a product of Nippon Shokubai Co., Ltd.) as the compound (C), and the mixture was sufficiently stirred. As a result, the emulsion for pressure-sensitive adhesive 1 of the present invention was obtained.

[Preparation and Evaluation of Tape]

The obtained emulsion for pressure-sensitive adhesive 1 was applied onto a release sheet ("K-80HS", a product of Sanei Kaken Co., Ltd.) in such a manner that the thickness of the layer after being dried was 25 μm. It was then dried in a hot air drier at 105° C. for 2 minutes, and was transferred to a polyethylene telephthalate film having a thickness of 50 μm to make it into a single-side adhesive tape. This adhesive tape was aged for at least one week in an atmosphere having a temperature of 23° C. and a humidity of 65%, and then, the adhesive properties thereof were evaluated.

Example 2

Repeating the steps of Example 1, an emulsion of a pressure-sensitive adhesive polymer (A-2) was produced by polymerization, except that the composition of the monomer components and the TDM amount were changed as shown in Table 1, and 2.0 parts of ethylenically unsaturated double bond-containing reactive emulsifier ("AQUARON HS-10": ammonium sulfate of polyoxyethylene nonyl propenyl phenyl ether, a product of Daiichi Kogyo Seiyaku Co., Ltd.) was used as the emulsifier. The Tg and the Mw of the pressure-sensitive adhesive polymer emulsion (A-2) were measured, and the results of the measurements are shown in Table 1.

Next, as was conducted in Example 1, 3.4 parts of 25% aqueous solution of ammonia, 15 parts of "KE-604" (aforementioned rosin derivative (B')) and a certain amount of water were added to the emulsion (A-2), and the mixture was stirred to prepare a rosin derivative(B)-containing emulsion (AB-2). The solid content (%), the average particle diameter (nm), and the pH of the emulsion (AB-2) were measured, and the results of the measurement are as shown in Table 1.

The viscosity of 100 parts of the emulsion (AB-2) was adjusted by the thickner as well as Example 1, and into the obtained emulsion, added was 0.5 parts (corresponding to 0.15 equivalent with respect to one equivalent of the carboxyl group of the above-described "KE-604") of "TETRAD®-C" (a compound having 4 glycidyl groups in its one molecule, a product of Mitsubishi Gas Chemical Co., Ltd.) as the compound (C), and the mixture was sufficiently stirred. As a result, an emulsion for pressure-sensitive adhesive 2 of the present invention was obtained. Repeating the steps of Example 1, an adhesive tape was produced using the emulsion for pressure-sensitive adhesive 2, and its adhesive properties were evaluated.

Example 3

An emulsifier for use in the polymerization of a pressure-sensitive adhesive polymer (A-3) was prepared by the following steps. Into a flask equipped with a stirrer, a reflux condenser, a nitrogen gas inlet pipe, a thermometer, and a dropping funnel, 180 parts of isopropyl alcohol was charged, and the isopropyl alcohol was refluxed for 10 minutes while nitrogen gas was introduced into the flask and the temperature inside the flask was raised to 81° C. A monomer mixture, which had been prepared beforehand, including 144 parts of acrylic acid, 28.3 parts of n-dodecyl mercaptan, 33.6 parts of lauryl-tridecyl acrylate mixture, and 0.22 parts of azobisisobutyronitrile as an initiator was added dropwise into the flask for 2 hours to carry out polymerization. As a result, a solution having 53.4% of solid content was obtained. From the solution, the isopropyl alcohol was removed under reduced pressure to obtain a carboxyl group-containing oligomer emulsifier. The acid value of the emulsifier was 544, and the Mw was 2,840.

Repeating the steps of Example 1, a pressure-sensitive adhesive polymer emulsion (A-3) was produced except that the composition of the monomer components and the TDM amount were changed as shown in Table 1, and 1.5 parts of the carboxyl group-containing oligomer emulsifier obtained above was used as emulsifier. The oligomer emulsifier was used in a neutralized state by adding 1.0 part of 25% aqueous solution of ammonia to 1.5 parts of the oligomer emulsifier. The Tg and the Mw of the emulsion (A-3) were measured, and the results of the measurement are shown in Table 1. Next, as was conducted in Example 1, the emulsion (A-3) was mixed with 2.2 parts of 25% aqueous solution of ammonia, a rosin derivative (B') having an acid value of 245 and a softening point of 131° C. ("KE-604B" having Mn of 400 and Mw of 420, a product of Arakawa Kagaku Co., Ltd.) and a certain amount of water, and the mixture was stirred to obtain a rosin derivative(B)-containing emulsion (AB-3). The solid content (%), the average particle diameter (nm), and the pH of the emulsion (AB-3) were measured, and the results of the measurements are as shown in Table 1.

The viscosity of 100 parts of the emulsion (AB-3) was adjusted by the thickner as well as Example 1, and into the obtained emulsion, 1.5 parts (corresponding to 0.76 equivalent with respect to one equivalent of the carboxyl group of "KE-604B") of "TETRAD®-C" as the compound (C) was added, and the mixture was sufficiently stirred. As a result, an emulsion for pressure- sensitive adhesive 3 of the present invention was obtained. Repeating the steps of Example 1, an adhesive tape was produced using the emulsion for pressure-sensitive adhesive 3 and its adhesive properties were evaluated.

Example 4

The viscosity of 100 parts of the rosin derivative(B)-containing emulsion (AB-1) obtained in Example 1, was adjusted by the thickner as well as Example 1, and into the obtained emulsion, 3.0 parts (corresponding to 1.52 equivalent with respect to one equivalent of the carboxyl group of "KE-604") of "TETRAD®-C" was added as the compound (C), and the mixture was sufficiently stirred. As a result, an emulsion for pressure-sensitive adhesive 4 was obtained. Repeating the steps of Example 1, an adhesive tape was produced using the emulsion for pressure-sensitive adhesive 4, and its adhesive properties were evaluated.

Comparative Example 1

Repeating the steps of Example 1, an emulsion of a pressure-sensitive adhesive polymer (A-4) was produced by polymerization, except that the composition of the monomer components and the TDM amount were changed as shown in Table 1, and 2.0 parts of "HITENOL N-08" was used, and 0.1 parts of potassium persulfate as a polymerization initiator was added to the monomer pre-emulsion instead of ACVA, and 0.1 parts of potassium persulfate as a polymerization initiator was put in the flask into which the monomer pre-emulsion was added dropwise. The Tg and the Mw of the emulsion (A-4) were measured, and the results of the measurements are shown in Table 1. Then, without adding the rosin derivative (B') to the emulsion (A-4), the solid content, the average particle diameter (nm), and the pH of the emulsion (A-4) were measured, and the results of the measurements are as shown in Table 1. The viscosity of the emulsion (A-4) was adjusted by the thickner as well as example 1, then without adding the compound (C) to the emulsion (A-4), an adhesive tape was produced using the emulsion (A-4) and its adhesive properties were evaluated.

Comparative Example 2

The viscosity of the emulsion (AB-3) obtained in Example 3 was adjusted by the thickner as well as example 1. An adhesive tape was produced using the emulsion (AB-3) to which no compound (C) was added, and its adhesive properties were evaluated.

Tables 1 and 2 show the results of the above-described measurements and evaluations. In Table 1, the names of the monomers are abbreviated as follows. The numbers shown on the right side of the following list are the values of the glass-transition temperature Tg (K) of homopolymers described in the Polymer Handbook:

| | |
|---|---|
| 2EHA: 2-ethylhexylacrylate | 223K |
| HEMA: 2-hydroxyethyl methacrylate | 328K |
| MMA: methyl methacrylate | 378K |
| BA: n-butylacrylate | 219K |
| EA: ethylacrylate | 249K |
| MAA: methacrylic acid | 501K |

TABLE 1

| Emulsion No. | | AB-1 | AB-2 | AB-3 | A-4 |
|---|---|---|---|---|---|
| Monomers (parts) | 2EHA | 95 | 85 | 75 | 80 |
| | HEMA | 5 | 5 | 5 | 3 |
| | BA | | | 10 | 10 |
| | MMA | | 10 | 10 | |
| | EA | | | | 5 |
| | MAA | | | | 2 |
| Emulsifiers (parts) | HITENOL N-08 | 1.5 | | | 2.0 |
| | AQUALON HS-10 | | 2.0 | | |
| | Synthesized emulsifier | | | 1.5 | |
| TDM (parts) | | 0.05 | 0.02 | 0.1 | 0.03 |
| Tg(° C.) | | −46 | −37 | −37 | −44 |
| Mw | | 550,000 | 430,000 | 450,000 | 320,000 |
| 25% aqueous solution of ammonia (parts) | | 2.2 | 3.4 | 2.2 | |
| Rosin derivative "KE-604" (parts) | | 10 | 15 | | |
| Rosin derivative "KE-604B" (parts) | | | | 10 | |
| Solid content (%) | | 54.5 | 54.8 | 54.3 | 55.0 |
| Average particle diameter (nm) | | 240 | 220 | 250 | 200 |
| pH | | 7.9 | 8.1 | 8.2 | 6.2 |

TABLE 2

| | Example | | | | Comparative Example | |
|---|---|---|---|---|---|---|
| | 1 | 2 | 3 | 4 | 1 | 2 |
| Emulsion No. (100 parts) | AB-1 | AB-2 | AB-3 | AB-1 | A-4 | AB-3 |
| Compound (C) CHEMITITE PZ-33 (parts) (equivalent*) | 1.0 (0.34) | 0 | 0 | 0 | 0 | 0 |
| TETRAD ®-C (parts) (equivalent*) | 0 | 0.5 (0.15) | 1.5 (0.76) | 3.0 (1.52) | 0 | 0 |

Remarks *the "equivalent" is an equivalent of the functional groups with respect to the carboxyl groups of the rosin derivative.

[Evaluation Method of Adhesion Properties]

The adhesive properties of the respective adhesive tapes obtained in Examples 1 to 4 and Comparative Examples 1 and 2 were evaluated by the following evaluation methods. The results of the evaluations are shown in Tables 3 and 4.

1. Shear Adhesion (Adherend :Stainless Steel)

Performed according to JIS Z 0237. An adhesive tape having a width of 25 mm and a length of about 150 mm was stuck onto a stainless steel plate over an sticking area of 25 mm×25 mm. The part of the tape which was not stuck to the stainless steel plate was folded over inwards to obtain a test sample. The test sample was then suspended vertically in a thermostat at 40° C. A 1 kg of load was hung from the folded-over part of the adhesive tape. The test sample was left in this condition for 24 hours. The length of slip (mm) after 24 hours was measured. The evaluation "A" means that the adhesive tape did not fall from the stainless steel plate, and "D" means that the adhesive tape fell from the stainless steel plate.

2. Adhesive Strength (Adherend :Stainless Steel)

Performed according to JIS Z 0237. The force of resistance (23° C.) was measured when the adhesive tape having a width of 25 mm stuck to a stainless steel plate was peeled off at an angle of 180°. The evaluation "A" means that a force of 353 N/m (900 g/25 mm) or larger was required to peel off the adhesive tape, and "D" means that a force of less than 353 N/m (900 g/25 mm) was required to peel off the adhesive tape.

3. Adhesive Strength (Adherend :Polyethylene)

Performed according to JIS Z 0237. The force of resistance (23° C.) was measured when the adhesive tape having a width of 25 mm stuck to a polyethylene plate was peeled off at an angle of 180°. The evaluation "A" means that a force of 137 N/m (350 g/25 mm) or larger was required to peel off the adhesive tape, and "D" means that a force of less than 137 N/m (350 g/25 mm) was required to peel off the adhesive tape.

4. Water Absorption Ratio

The weight of a piece of adhesive tape cut to a dimension of 25 mm×70 mm was measured and was taken to be Wa. This piece of adhesive tape was then immersed in 50 cc of water at 23° C. for 24 hours. It was then taken out of the water and the water remaining on the surface was lightly wiped off. The weight thereof was then measured again and was taken to be Wb. Then the weight of a piece of polyethylene terephthalate film of dimension 25 mm×70 mm was separately measured and take to be Wc. The water absorption ratio was calculated according to the following formula using these weights:

Water absorption ratio (%)=(Wb−Wa)/(Wa−Wc)×100

The evaluation "A" means that the water absorption ratio was less than 10%, "B" means that the water absorption ratio was in the range of 10% to less than 25%, "C" means that the water absorption ratio was in the range of 25% to less than 50%, and "D" means that the water absorption ratio was 50% or larger.

5. Resistance to Whitening in Water

A piece of adhesive tape cut to a dimension of 25 mm×70 mm was immersed in 50 cc of water at 23° C. for 24 hours. The whitening of the pressure-sensitive adhesive layer was visually evaluated. The evaluation "A" means that the pressure-sensitive adhesive layer looked transparent, "B" means that the pressure-sensitive adhesive layer was whitened a little, and "D" means that the pressure-sensitive adhesive layer was whitened.

6. Coating Property

The emulsion was applied onto a release sheet ("K-80HS", a product of Kaken Kogyo Co., Ltd) onto which a peeling treatment was conducted with a silicone, in such a manner that the thickness of the layer after being dried was 75 μm, and the coating property was visually evaluated. The evaluation "A" means that the pressure-sensitive adhesive layer in a perfect condition was formed with no crawling, shrinking, streak, and pinholes. The evaluation "B" means the pressure-sensitive adhesive layer having no problem for a practical use was formed with almost no crawling, shrinking, streak, and pinholes. The evaluation "D" means the pressure-sensitive adhesive layer had crawling, shrinking, streak, or pinholes.

TABLE 3

| | Example | | | |
|---|---|---|---|---|
| | 1 | 2 | 3 | 4 |
| Shear adhesion:length of slip(mm) (stainless steel) | 0:A | 0:A | 0:A | 0:A |
| Adhesive strength (N/m) (g/25 mm) (stainless steel) | 396:A (1010) | 419:A (1070) | 400:A (1020) | 361:A (920) |
| Adhesive strength (N/m) (g/25 mm) (polyethylene) | 149:A (380) | 157:A (400) | 153:A (390) | 145:A (370) |
| Water absorption ratio (%) | 20:B | 2.8:A | 3.5:A | 13.8:B |
| Resistance to whitening in water | B | A | B | B |
| Coating property | B | A | B | B |

TABLE 4

| | Comparative Example | |
|---|---|---|
| | 1 | 2 |
| Shear adhesion:length of slip (mm) (stainless steel) | 0.1:A | Dropped: D |
| Adhesive strength (N/m) (g/25 mm) (stainless steel) | 310:D (790) | 474:A (1210) |
| Adhesive strength (N/m) (g/25 mm) (polyethylene) | 133:D (340) | 165:A (420) |
| Water absorption ratio (%) | 61:D | 29:C |
| Resistance to whitening in water | D | B |
| Coating property | D | B |

According to the present invention, the emulsion for pressure-sensitive adhesive is obtained by combining a pressure-sensitive adhesive polymer with a rosin derivative and a compound having a functional group reactive with the carboxyl groups of the rosin derivative. Thus-produced emulsion forms a pressure-sensitive adhesive layer with high water resistance. In addition, the pressure-sensitive adhesive layer exhibits high adhesive properties such as adhesive strength, adhesion to polyolefin, and cohesive strength. Therefore the pressure-sensitive adhesive products producing by using the emulsion for pressure-sensitive adhesive of the present invention have high performance.

What is claimed is:

1. An emulsion for a pressure-sensitive adhesive comprising as essential components:

a pressure-sensitive adhesive polymer (A) having a glass-transition temperature of −80 to −20° C., a weight-average molecular weight of 150,000 or larger, and a carboxylic acid value of 30 or smaller;

a rosin derivative (B) having carboxyl groups and having a weight-average molecular weight of 100,000 or smaller, and containing at least part of the carboxyl groups in alkali form with a carboxylic acid value of 190 or larger before alkalization; and a compound (C) having a weight-average molecular weight of 100,000 or smaller, and having no carboxyl group but having at least one functional group reactive with a carboxyl group in its molecule, wherein the amount of the rosin derivative (B) is 2 to 30 mass percent when the total amount of the pressure-sensitive adhesive polymer (A) and the rosin derivative (B) in the emulsion is defined as 100 mass percent, and wherein the compound (C) is contained in the emulsion so that the functional group of the compound (C) is in an amount of 0.05 to 10 equivalent with respect to one equivalent of the carboxyl groups of the rosin derivative (B) before alkalization.

2. An emulsion for a pressure-sensitive adhesive according to claim 1, wherein the emulsion comprises an emulsifier having no reactivity with a monomer for the pressure-sensitive adhesive polymer (A), and the emulsifier being a component other than the polymer (A), the rosin derivative (B) and the compound (C).

3. An emulsion for a pressure-sensitive adhesive according to claim 1, wherein the compound (C) is an aziridinyl group-containing compound and/or polyglycidyl amine.

4. An emulsion for a pressure-sensitive adhesive according to claim 1, obtained by: preparing the emulsion of a pressure-sensitive adhesive polymer (A) by emulsion polymerization using an emulsifier having no reactivity with a monomer for the pressure-sensitive adhesive polymer (A) and/or a reactive emulsifier having an ethylenically unsaturated double bond; adding an alkaline aqueous solution to the emulsion to prepare an alkaline emulsion; adding a carboxyl group-containing rosin derivative (B') having an weight-average molecular weight of 100,000 or smaller and having an acid value of 190 or larger to the alkaline emulsion; and adding the compound (C) to the alkaline emulsion.

5. An emulsion for a pressure-sensitive adhesive according to claim 1, wherein pressure-sensitive adhesive polymer (A) is an acrylic polymer obtained by polymerization of monomers including an alkyl(meth)acrylate.

6. An emulsion for a pressure-sensitive adhesive according to claim 1, wherein the carboxylic acid value is between 210 and 270.

7. An emulsion for a pressure-sensitive adhesive according to claim 1, wherein the weight-average molecular weight of rosin derivative (B) is between 10,000 and 100.

8. An emulsion for a pressure-sensitive adhesive according to claim 7, wherein the weight-average molecular weight of rosin derivative (B) is between 3,000 and 100.

9. An emulsion for a pressure-sensitive adhesive according to claim 1, wherein the rosin derivative (B) before alkalization has a softening point of 200° C. or lower.

10. An emulsion for a pressure-sensitive adhesive according to claim 9, wherein the softening point is in the range of 80 to 180° C.

11. An emulsion for a pressure-sensitive adhesive according to claim 1, wherein the amount of rosin derivative (B) is 10 to 23 mass percent.

12. An emulsion for a pressure-sensitive adhesive according to claim 1, wherein the at least one functional group of compound (C) is selected from the group consisting of glycidyl group, aziridinyl group, oxazolinyl group, and isocyanate group.

13. An emulsion for a pressure-sensitive adhesive according to claim 12, wherein the at least one functional group is an isocyanate group which is blocked.

14. An emulsion for a pressure-sensitive adhesive according to claim 1, wherein the compound (C) has a molecular weight smaller than 100,000.

15. An emulsion for a pressure-sensitive adhesive according to claim 14, wherein the compound (C) has a molecular weight smaller than 10,000.

16. An emulsion for a pressure-sensitive adhesive according to claim 15, wherein the compound (C) has a molecular weight smaller than 5,000.

17. An emulsion for a pressure-sensitive adhesive according to claim 1, wherein the functional group of the compound (C) is in an amount of 0.1 to 5 equivalent with respect to one equivalent of the carboxyl groups of the rosin derivative (B) before alkalization.

18. An emulsion for a pressure-sensitive adhesive according to claim 2, wherein the emulsifier has a weighted average molecular weight of smaller than 100,000, and an acid value of 185 or smaller.

19. An emulsion for a pressure-sensitive adhesive according to claim 18, wherein the emulsifier is a carboxyl group-containing emulsifier.

20. An emulsion for a pressure-sensitive adhesive according to claim 4, wherein the reactive emulsifier is selected from the group consisting of allyl group-containing anionic emulsifiers, allyl group-containing nonionic emulsifiers, allyl group-containing cationic emulsifiers, (meth)acryloyl group-containing anionic emulsifiers, (meth)acryloyl group-containing nonionic emulsifiers, propenyl group-containing anionic emulsifiers, and propenyl group-containing nonionic emulsifiers.

* * * * *